July 7, 1942.  C. H. NAZRO  2,288,638
LIQUID SEAL
Filed Jan. 21, 1941

CHARLES H. NAZRO
INVENTOR
BY Lyon & Lyon
ATTORNEYS

Patented July 7, 1942

2,288,638

UNITED STATES PATENT OFFICE 2,288,638

LIQUID SEAL

Charles H. Nazro, Los Angeles, Calif., assignor to Byron Jackson Co., Huntingdon Park, Calif., a corporation of Delaware Application January 21, 1941, Serial No. 375,142

6 Claims. (Cl. 286—9)

This invention relates generally to a shaft sealing device, and is directed particularly to improvements in liquid seals employed for sealing the juncture of a rotating shaft and a stationary housing.

In its simplest form, a seal of the above-mentioned type preferably embodies a cup-shaped container secured to the shaft to rotate therewith and forming a chamber containing a body of mercury or other sealing liquid, and a stationary annular baffle member secured at its upper end to the stationary housing and extending downwardly into the body of sealing liquid. The baffle thus divides the free surface of the sealing liquid into two isolated surfaces communicating respectively with the interior and the exterior of the housing, and separated from each other by the baffle and by the two bodies of sealing liquid lying on opposite sides of the baffle. Obviously, in order for internal or external fluid to pass from one side of the baffle to the other it must migrate through the body of sealing liquid and beneath the lower end of the baffle.

A seal of the foregoing type has proven to be more effective than any other type of seal in sealing the shaft opening in the housing of a submersible electric motor. When operating submerged in water or other conducting liquid, it is essential that leakage of the external liquid into the housing through the shaft opening be entirely eliminated inasmuch as any leakage, even at an infinitesimal rate, would eventually break down the insulation on the motor windings and cause the motor to burn out. It has been found that a body of heavy sealing liquid, such as mercury, interposed between the external and internal liquids will not necessarily form a perfect seal, because of the tendency for minute particles of external liquid to migrate through the mercury. One of the principal factors contributing to migration of external liquid through the mercury is the tendency to the formation of a film of external liquid on the shaft below the level of the mercury. This is due partly to the fact that the high surface tension of the mercury prevents its wetting the shaft, and partly to the fact that the centrifugal force developed in the mercury during high speed rotation thereof produces a zone of minimum pressure adjacent the shaft.

A principal object of this invention is to prevent the formation of a film of external liquid on the shaft, and thereby eliminate the principal cause of migration of external liquid through the mercury.

A further object is to reduce the tendency for displacement of mercury outwardly beneath the baffle due to centrifugal force, and to maintain a body of uncontaminated mercury at substantial pressure immediately adjacent the shaft.

Other objects and advantages will be apparent from the following detailed description of a preferred embodiment of the invention, reference being had to the accompanying drawing wherein.

Figure 1:
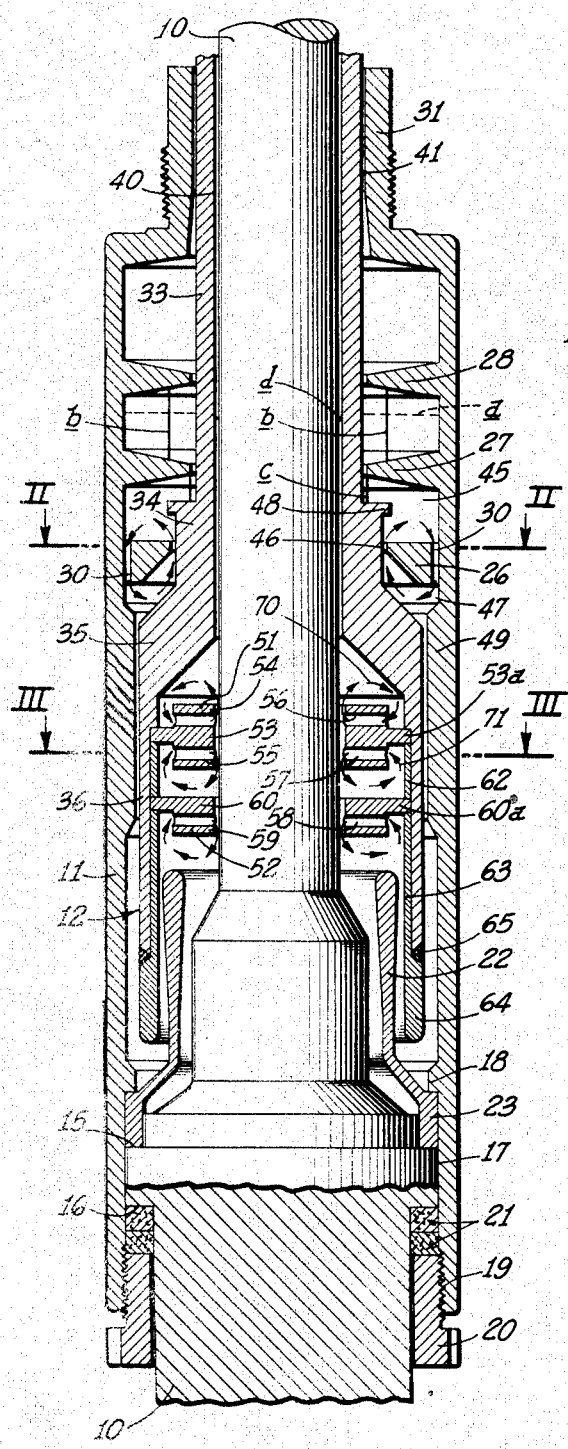
Fig. 1 is a longitudinal sectional view of the seal.

Referring to Fig. 1, the seal comprises generally a shaft 10, a shell or cup member 11 secured at its lower end to the shaft, and an annular baffle member 12 surrounding the shaft and extending downwardly within the cup member 11 to a point adjacent the bottom of the annular chamber formed between the shaft and the cup. I have shown only that portion of the shaft which extends through the seal, but it will be understood that the shaft extends both downwardly and upwardly into operative engagement with driving and driven elements. A pair of oppositely facing shoulders 15 and 16 are formed on the lower portion of the shaft at opposite ends of an outwardly extending flange portion 17. The cup member 11 fits snugly about the flange 17, and is provided with an inwardly projecting flange 18 above the flange 17, and an internally threaded socket 19 below the flange 17. A clamp nut 20 is threaded into the socket 19 and engages suitable packing 21 to press the latter against the shoulder 16 and at the same time clamp the flange 18 downwardly. A thimble 22 surrounds the shaft and is provided with an outwardly extending flange 23 interposed between the flange 18 and the shoulder 15, and it will be apparent that when the clamp nut 20 is tightened, the cup member 11 and the thimble 22 are rigidly clamped to the shaft in concentric relation thereto and the packing 21 is compressed to form a fluid-tight seal between the shaft and cup member.

Figure 2:
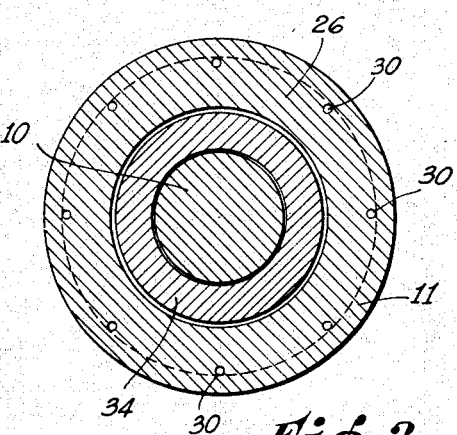
Figs. 2 and 3 are transverse sectional views taken in lines II—II and III—III, respectively, of Fig. 1.

A plurality of annular flanges 26, 27 and 28 project inwardly from the cup member 11 adjacent its upper end. It will be observed that the two uppermost flanges 27 and 28 are identical, and that the inner edge or lip of the lowermost flange 26 is disposed a substantial distance outwardly of the lips of the flanges 27 and 28. It will also be observed that a plurality of circumferentially spaced ports 30 (Fig. 2) extend vertically through the outer portion of the flange 26, for a purpose which will presently be described. At a suitable distance above the upper flange 28, the cup member 11 is reduced in diameter to form a neck portion 31.

The baffle 12 comprises generally an upper, relatively narrow cylindrical neck portion 33 fitting closely within the neck 31 of the cup member and having close running clearance with the shaft 10, a thickened cylindrical portion 34 in the region of the flange 26, a downwardly and outwardly diverging portion 35 below the cylindrical portion 34, and a depending cylindrical skirt 36 extending downwardly in telescoping relation to the thimble 22 to a point adjacent the bottom of the annular chamber formed between the cup member 11 and the shaft. The upper portion of the baffle above the upper extremity of the cup member 11 is not shown in the drawing, but it will be understood by those familiar with this type of seal that the baffle extends upwardly a suitable distance and is clamped in fluid-tight relation to the wall of the housing through which the shaft projects. The annular channel 40 between the shaft and the baffle is thus in open communication with the fluid externally of the housing, and the annular channel 41 between the outer wall of the baffle and the neck 31 of the cup member is in open communication with the fluid within the housing. It will be apparent that if the seal chamber between the shaft and the cup member is filled with mercury or other sealing liquid to a point well above the lower edge of the baffle, the external liquid must travel through the body of mercury and beneath the lower edge of the baffle in order to pass from the channel 40 to the channel 41. The chamber is normally filled with mercury to the level indicated by the dotted line a.

When the shaft and the cup member are rotated, rotation of the mercury is induced by those surfaces on the shaft and cup member which contact the mercury, and is retarded by the surfaces on the stationary baffle which are in contact with the mercury. The induced rotation is usually sufficient, however, to create centrifugal force of considerable magnitude, tending to displace mercury from the inner side to the outer side of the baffle, and resulting in the formation of a vortex adjacent the shaft which would be filled with the external fluid entering the seal chamber by way of the channel 40. This would be highly objectionable for several reasons, chief of which are that the external fluid would be admitted to a point adjacent the lower end of the baffle, and the thickness of the body of mercury between the shaft and the baffle would be materially reduced. The likelihood of minute particles of external fluid becoming entrained in the mercury and migrating beneath the baffle would thus be greatly enhanced.

This "draw-down," or displacement of mercury outwardly beneath the baffle, is avoided in the present instance by the provision of the series of ports 30 extending vertically through the flange 26. The body of mercury in the compartment 45 between the flanges 26 and 27 is contacted on three sides by rotating surfaces and hence is rotated at a speed which approaches that of the shaft and cup member. On the other hand, the mercury immediately below the flange 26 is contacted by a relatively large stationary surface on the baffle and by relatively small rotating surfaces on the cup member, and hence its speed of rotation is substantially less than that of the mercury above the flange 26. Inasmuch as the pressure developed by centrifugal force is a function of the rotative speed of the mercury, the pressure in the radially outer portion of the compartment 45 exceeds that in the compartment immediately below the flange 26. The ports 30 thus function as discharge ports of a continuously acting pumping means, discharging streams of mercury downwardly through the ports and causing a continuous circulation upwardly through the annular channel 46 between the inner edge or lip of the flange 26 and the baffle as indicated by the arrows 47. By suitably regulating the size and number of the ports 30 and the size of the annular return channel 46 between the flange and the baffle, any desired pumping effect can be produced, to exert a back-pressure on the mercury below the flange 26 and counteract the tendency for mercury to be displaced outwardly beneath the lower edge of the baffle.

Looked at in another way, the pressure in the outer part of the chamber 45 is so much greater than the pressure at the inner part, by virtue of the centrifugal force resulting from the relatively high velocity of the mercury in the chamber 45, that by providing the ports 30 and making them of sufficient size and number, mercury can be returned from chamber 35 through the ports 30 as fast as it escapes through the passage 46. It follows, obviously, that if mercury is returned from the chamber 45 as fast as it enters the chamber, there can be no total change in the volume of mercury below the flange 26, and hence no "draw-down."

As previously mentioned, the inner lip of the flange 26 is disposed radially outwardly of the lip of the flange 27. If the seal chamber is filled with mercury up to the level indicated at a, so as to submerge the flange 27 in mercury, the free surface of the mercury on the outer side of the baffle will assume the positions indicated by the full lines b and c during rotation, and the upward flow of mercury through the channel 46 will occur entirely within the body of mercury. On the other hand, if the lip of the flange 26 were disposed in vertical alignment with the lip of the flange 27, the mercury flowing upwardly past the flange 26 would be discharged into a body of internal liquid. If the latter were oil, as is often the case, a mercury-oil emulsion would be formed and would have a detrimental effect on the operation of the seal. It is deemed preferable to not only confine the circulation of mercury wholly within the body of mercury, but also to provide an outwardly extending flange 48 on the baffle directly above the channel 46, to deflect the upwardly flowing mercury radially outwardly away from the contact surface c.

In order to confine the circulation of the mercury around the flange 26 to the region immediately adjacent thereto, a substantial portion of the inner wall of the cup 11 in offset inwardly at 49 into closely spaced relation to the outer wall of the baffle. A relatively long, narrow annular throttle passage is thus interposed between the pumping zone and the lower edge of the baffle, protecting the main body of mercury from any turbulence produced by the jets of mercury issuing from the ports 30.

The construction thus far described is similar in all essential respects to that shown and described in the copending application of Aladar Hollander, Vaino A. Hoover and Charles H.

Nazro, Serial No. 348,458, filed July 30, 1940, for Liquid seal, and reference may be had thereto for a more detailed discussion of the operating principle of the back-pressure pumping means. It will suffice for the present purpose to state that by the provision of the circulation ports 30 in the flange 26, "draw-down" of mercury on the inner side of the baffle is avoided, and, by the proper selection of the size and number of the ports 30, the surface of contact between the mercury and the external fluid may be maintained approximately at the same level in the channel 40 both while the shaft and cup are rotating and while they are stationary, the operating level being indicated at $d$.

It has been proven by extensive tests, however, that the elimination of "draw-down" does not preclude the formation of a thin film of external liquid between the shaft and the body of mercury, especially if the external liquid is water or other liquid which readily wets the shaft. Even such a thin film is objectionable inasmuch as it may extend downwardly to the base of the mercury chamber and there be entrained in the body of mercury and gradually migrate outwardly beneath the lower edge of the baffle. I have found that it is possible to break up this film of external liquid and confine it to the upper portion of the shaft where its entrainment in the mercury can have no harmful effect. In general, this is accomplished by directing one or more circumferential series of streams of "dry" or uncontaminated mercury radially inwardly against the shaft in the upper portion of the seal chamber. The novel means for performing this function will now be described.

A vertical series of annular diffuser plates 51 and 52 are mounted in the annular space between the shaft and the baffle skirt 36. The plate 51 comprises an imperforate central body portion 53 having an outwardly projecting flange 53a rigidly secured to the baffle skirt, and upper and lower extensions 54 and 55 spaced radially inwardly from the baffle skirt. A circumferential series of ports 56 extend radially through the upper extension 54, and a similar series of ports 57 are formed in the lower extension 55, as seen most clearly in Fig. 3. The lower diffuser plate 52 is generally similar to the upper plate 51, but embodies only a single series of radial ports 58 in a lower extension 59 below the imperforate section 60.

The flange 53a of the upper plate is clamped between a downwardly facing shoulder on the baffle skirt 36 and a sleeve 62. The flange 60a on the lower plate 52 is similarly clamped between the lower end of the sleeve 62 and the sleeve portion 63 of a baffle skirt extension 64 secured to the baffle skirt as by welding at 65.

Figure 3:
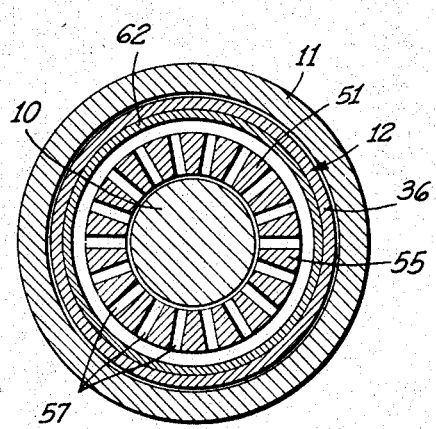

The operation of the diffuser plates is as follows: During rotation of the shaft and cup member, the mercury is caused to rotate by contact with the rotating surfaces, although it will be understood that the rotative speed of the mercury will be lower than that of the shaft because of the retarding effect exerted by the stationary surfaces on the baffle and the diffuser plates. Inasmuch as the pressure developed in the rotating mercury by centrifugal force is a function of the linear velocity, which increases in proportion to the distance from the axis of rotation, the pressure adjacent the inner wall of the baffle skirt exceeds that adjacent the shaft. In other words, the pressure prevailing at the outer ends of the radial ports 56, 57 and 58 in the diffuser plates exceeds that at the inner ends of the ports. Consequently, mercury will flow inwardly through the ports and will discharge against the shaft. As seen in Fig. 3, the inner ends of each circumferential series of ports are spaced only a short distance apart, and the series of jets issuing therefrom constitutes in effect a continuous sheet of mercury impinging on the shaft in the plane of each series of ports.

Because of the higher pressure prevailing at the outer ends of the ports, any external liquid which may have become entrained in the mercury in the region of the shaft will have been squeezed out before the mercury again reaches the outer edge of the plates, and consequently the mercury flowing inwardly through the ports is "dry," or uncontaminated by external liquid. The effect of this continuous impingement of "dry" mercury against the shaft is to break up the film of external liquid on the shaft and to confine it to the region above the uppermost series of ports 56.

It will be apparent from a consideration of pressure conditions at the inner end of each series of ports, that the discharge from the upper series of ports 56 is caused to flow upwardly around the upper extension 54, as indicated by the arrows 70, and that consequently any external liquid clinging to the shaft will be dislodged therefrom by the uppermost series of jets and returned to the region above the upper diffuser plate 51. The pressure developed at the inner ends of the lowermost series of ports 58 is obviously equal to that at the inner ends of the intermediate series of ports 57, and consequently the mercury issuing from the ports 57 cannot flow downwardly past the ports 58 but is constrained to circulate in a closed path including the ports 57 and the space between the two diffuser plates, as indicated by the arrows 71. Furthermore, the mercury issuing from the uppermost series of ports 56 cannot flow downwardly past the ports 57 except by displacing mercury downwardly from the intermediate space between the plates. It therefore follows that the discharge from the uppermost ports 56 is constrained to flow upwardly into the space above the upper diffuser plate 51, carrying with it any particles of external liquid dislodged from the shaft. It will also be apparent that should any particles of external liquid escape dislodgement from the shaft by the uppermost series of jets, they would be dislodged by the jets from the intermediate ports 57 and would be retained in the space between the two plates.

In addition to their primary function of breaking up the film of external liquid on the shaft, the diffuser plates perform another function which improves the performance of the seal. By reason of the continuous discharge of mercury radially inwardly through the ports in the diffuser plates, the pressure developed at the outer edge of the diffuser plates by centrifugal force is lowered, and the pressure adjacent the shaft is increased. As a consequence, the tendency to displace mercury from the inner side to the outer side of the baffle is decreased and less back-pressure is required in order to prevent "draw-down." The size and number of ports 30 in the flange 26 may be reduced proportionately, resulting in a less turbulent condition in the pumping zone.

While I have shown and described the diffuser plates in conjunction with other specific features such, for example, as the back-pressure pump, it is to be understood that this is merely for illustrative purposes, and that the diffuser plates would be equally effective in destroying the film of external liquid on the shaft, and in supplementing any force counteracting the "drawdown," irrespective of the other specific features of the seal. It will also be understood that various changes in the details of construction of the diffuser plates may be made without departing from the scope of the invention. For instance, while I have shown three superposed series of diffuser ports, a greater or lesser number may be employed if desired, and it is immaterial from a functional standpoint whether they are formed in separate diffuser plates or in a single unitary structure. Other obvious modifications will be readily apparent to those skilled in the art.

I claim:

1. A liquid seal for sealing the juncture of a rotating shaft and a stationary member, comprising: a cup secured to the shaft and defining therewith a receptacle containing a body of sealing liquid; a baffle secured to the stationary member and extending downwardly into the sealing liquid and dividing the receptacle into inner and outer compartments; and stationary means in the inner compartment having walls extending substantially radially between the inner and outer zones of the inner compartment and defining a confined fluid passage for conducting a stream of sealing liquid from the outer zone to the inner zone, while isolating the stream from the main body of liquid in the inner compartment.

2. A liquid seal for sealing the juncture of a rotating shaft and a stationary member, comprising: cup means secured to the shaft to rotate therewith and defining therewith a receptacle containing a body of sealing liquid; a baffle secured to the stationary member and extending downwardly around the shaft and into the sealing liquid; and means on said baffle having walls extending substantially radially from adjacent the inner wall of the baffle to adjacent the shaft, said walls defining a confined fluid passage for directing a stream of sealing liquid inwardly against the shaft, said walls isolating the stream from the main body of liquid.

3. A liquid seal for sealing the juncture of a rotating shaft and a stationary member, comprising: cup means secured to the shaft to rotate therewith and defining therewith a receptacle for sealing liquid; a baffle secured to the stationary member and extending downwardly into the receptacle to a point below the level of the sealing liquid therein; and means on the baffle having walls defining a circumferential series of confined fluid passages extending substantially radially inwardly from adjacent the inner wall of the baffle to adjacent the shaft.

4. A liquid seal as set forth in claim 3, in which said last-named means comprises an annular plate secured at its outer periphery to the inner wall of the baffle and having a circumferential series of fluid passages therein, each passage having an inlet adjacent the baffle and an outlet adjacent the shaft.

5. In a liquid seal of the type comprising a rotating member, a cup secured thereto and containing sealing liquid, and a baffle secured to a stationary member and extending downwardly around the rotating member and into the sealing liquid, and in which the sealing liquid is such that it fails to wet the surface of the rotating member and permits the formation of a film of extraneous liquid between said surface and the sealing liquid, the improvement comprising: means for dislodging said film of extraneous liquid from the surface of the rotating member, said means comprising a stationary member mounted in the cup between the rotating member and the baffle, and having walls defining a plurality of fluid passages extending radially therethrough in a common transverse plane, whereby, during rotation of the rotating member and cup, sealing liquid is caused to flow inwardly through said fluid passages and impinge on the surface of the rotating member to dislodge the film of extraneous liquid thereon.

6. A liquid seal for sealing the juncture of a rotating member and a stationary member, comprising: cup means secured to the rotating member and defining therewith a receptacle containing sealing liquid; a baffle secured to the stationary member and extending downwardly around the rotating member and into the sealing liquid to divide the receptacle into inner and outer compartments; and diffuser means in the inner compartment, comprising a diffuser plate secured to the inner wall of the baffle and projecting inwardly therefrom into close proximity to the rotating member, said plate having a central imperforate section, a circumferential series of ports extending radially through the plate above the imperforate section, and a second circumferential series of ports extending radially through the plate below the imperforate section.

CHARLES H. NAZRO.